310-369 SR

2/12/85 XR 4,499,479

United States Patent [19]

Chee-Shuen Lee et al.

[11] Patent Number: 4,499,479

[45] Date of Patent: Feb. 12, 1985

[54] GRAY SCALE PRINTING WITH INK JET DROP-ON DEMAND PRINTING HEAD

[75] Inventors: Francis Chee-Shuen Lee, San Jose; Ross N. Mills; Frank E. Talke, both of Morgan Hill, all of Calif.

[73] Assignee: International Business Machines Corporation, Armonk, N.Y.

[21] Appl. No.: 413,039

[22] Filed: Aug. 30, 1982

[51] Int. Cl.³ .............................................. G01D 15/16

[52] U.S. Cl. .................................. 346/140 R; 310/369

[58] Field of Search ................. 346/140 PD; 310/366, 310/369

[56] References Cited

U.S. PATENT DOCUMENTS

| | | | |
|---|---|---|---|
| 3,747,120 | 7/1973 | Stemme | 346/140 PD |
| 3,832,579 | 8/1974 | Arndt | 346/140 PD |
| 3,946,398 | 3/1976 | Kyser et al. | 346/1 |
| 4,222,060 | 9/1980 | Sato et al. | 346/140 |
| 4,251,824 | 2/1981 | Hara | 346/140 PD |
| 4,281,333 | 7/1981 | Tsuzuki et al. | 346/140 |
| 4,395,719 | 7/1983 | Majewski | 346/140 PD |

*Primary Examiner*—E. A. Goldberg
*Assistant Examiner*—Mark Reinhart
*Attorney, Agent, or Firm*—Otto Schmid, Jr.

[57] ABSTRACT

An ink jet drop-on-demand printing system having gray scale capability comprising a transducer having a plurality of separately actuable sections. Print data is provided which defines a selected drop volume and control means is provided which is operable in response to the print data to produce drive signals to selectively actuate a particular combination of the separately actuable sections of the transducer to produce a drop of the volume specified by the print data. To provide further control over the drop volume while maintaining the drop velocity within selected limits, the amplitude of the drive signals can also be varied. A further refinement can be provided by varying not only the amplitude of the drive signals but also the pulse width of the drive signals. In a first embodiment the transducer sections are of equal length, while the sections are of unequal length in a second embodiment.

7 Claims, 6 Drawing Figures

| DROP SIZE CODE | SEGMENT NUMBER | ROM ADDRESS | DATA SEGMENT BYTE | |
|---|---|---|---|---|
| | | | AMPLITUDE | PULSE WIDTH |
| 34 | 1 | 4d0 | 0010 | 0001 |
| | 2 | 4d1 | 0000 | 0000 |
| | 3 | 4d2 | 0100 | 0010 |
| | 4 | 4d3 | 0000 | 0000 |
| E9 | 1 | 7A4 | 0101 | 1110 |
| | 2 | 7A5 | 0010 | 1001 |
| | 3 | 7A6 | 1000 | 0110 |
| | 4 | 7A7 | 0100 | 1111 |

DROP SIZE ROM LOOK-UP TABLE

GRAY SCALE PRINTING WITH INK JET DROP-ON DEMAND PRINTING HEAD

FIELD OF THE INVENTION

This invention relates to ink jet printing apparatus and more particularly to ink jet printing apparatus in which ink drops are generated on demand in response to suitable electrical signals.

DESCRIPTION OF THE PRIOR ART

There have been known in the prior art ink jet printing systems in which a transducer is used to generate ink drops on demand. One example of such a system is commonly assigned U.S. Pat. No. 3,787,884 to Demer. In this system, the ink is supplied to a cavity by gravity flow and a transducer mounted in the back of the cavity produces motion when energized by an appropriate voltage pulse, which results in the generation of one ink drop. A different embodiment of a drop-on-demand system in which the transducer is radially arranged is U.S. Pat. No. 3,683,212 to Zoltan.

There has been increased interest in recent years in printing applications involving half tone printing of images or various shades of gray. To accomplish gray scale printing while using ink jet drop on demand apparatus, the volume of ink in each drop was varied in accordance with the gray scale value by adjusting the magnitude of the drive voltage pulse. However, this method had the disadvantage that the velocity of the drop was also changed. Since the print head is moving at a constant velocity during printing, the variation in drop velocity caused a displacement from the desired print position which produced distortion and the resultant degradation of print quality. Compensation for this distortion has been attempted by varying not only the amplitude but also the effective timing of each of the voltage pulses so that the drops reach the paper at the desired location. This compensation method requires complex control circuits which are difficult to modify to include future improvements.

SUMMARY OF THE INVENTION

It is therefore the object of this invention to produce an improved drop-on demand printing system having gray scale capability.

It is another object of this invention to produce an improved drop-on-demand printing system having simplified control circuits for producing ink drops of selectively varying volume at constant velocity. These and other objects are accomplished according to the present invention by drop-on-demand ink jet printing apparatus which comprise a transducer and means for selectively energizing the transducer to eject a single drop of ink each time the transducer is energized. The transducer comprises a plurality of separately actuable sections. Print data is provided which defines a selected drop volume within the range of 1 to n drop volumes required for printing the print data. Control means is provided which is operable in response to the print data to selectively actuate a particular combination of one or more of the separately actuable sections of the transducer to produce a drop of the volume specified by the print data.

In a first embodiment the separately actuable sections of the transducer are of equal length so that a particular range of drop volumes can be produced with velocity within preselected limits. Should the drop velocity variation exceed the preselected limits, the drive signals to the selected transducer sections are varied in amplitude to achieve the required range of drop volumes. Should still further refinement in control be required to produce the selected number of drops of different volume within the preselected drop velocity limits, the pulse width of the drive signals is also varied.

In a second embodiment, the separately actuable sections of the transducer are of unequal length so that a greater range of drop volumes can be produced with velocity within preselected limits. Successively finer control can be achieved as in the first embodiment by a selective variation in the amplitude and pulse width of the drive signals to the separately actuable sections of the transducer.

DESCRIPTION OF PREFERRED EMBODIMENT

Figure 1:
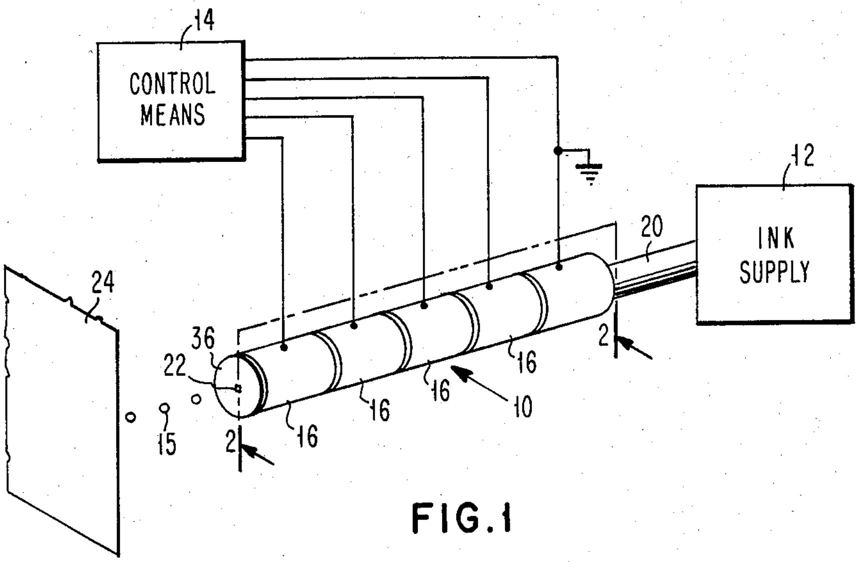
FIG. 1 is a diagrammatic schematic diagram of a specific embodiment of the drop-on-demand ink jet printing system embodying the invention.

Referring to FIG. 1, the printer apparatus comprises a print head 10 to which is supplied liquid ink from ink supply means 12. Control means 14 provides the voltage control pulse to selectively energize print head 10 to produce one ink drop 15 for each voltage pulse supplied to print head 10. Print head 10 comprises a transducer means 16 having an ink cavity 18 formed therein. Cavity 18 is maintained filled with ink through supply line 20 from ink supply means 12. Ink from supply means 12 is not pressurized so the ink in cavity 18 is maintained at or near atmospheric pressure under static conditions. An exit from cavity 18 is provided by nozzle portion 22 which is designed so that the ink does not flow out of or air does not flow into nozzle portion 22 under static conditions. In the embodiment shown in FIG. 1, transducer means 16 contracts and expands radially inward when energized with a suitable voltage pulse to thereby create a pressure wave in cavity 18 so that liquid ink is expelled out through nozzle portion 22 to form a single drop 15 of ink. Control means 14 provides the voltage control pulses to selectively energize transducer means 16 to produce one ink drop for each voltage pulse applied to transducer means 16, and by a series of suitable voltage pulses a desired pattern can be produced on record member 24.

Figure 2:
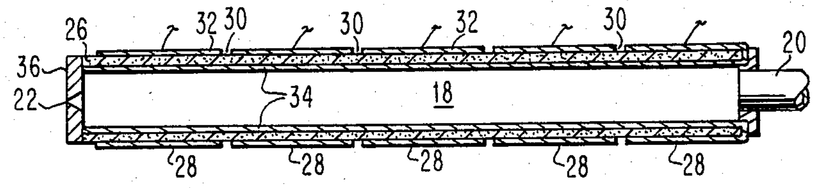
FIG. 2 is a longitudinal section view along lines 2—2 of FIG. 1.

As shown in FIG. 2, the transducer means 16 in the specific embodiment comprises a hollow cylindrical piezoelectric member 26 which forms ink cavity 18 in its enclosed interior. Member 26 is divided into a plurality of separately actuable sections 28 by means of circumferential openings 30 in the outer conductive coating 32. Each of the separately actuable sections is energized by a voltage pulse applied between that section's outer conductive coating 32 and inner conductive coating 34. Inner conductive coating 34 is bridged across the end of piezoelectric member 26 away from nozzle plate 36 which closes one end of member 26 and includes nozzle portion 22. An opening 30 is provided to separate a common terminal section 38 from the last separately actuable section 28. Each of the sections 28 can be actuated by a voltage pulse either alone or in combination with any other sections 28 to produce an ink drop having a volume proportional to the number of sections energized. The velocity of the drops also changes depending upon the number of sections energized. However, depending on the type of printing and the print quality required, gray scale printing can be accomplished with this apparatus without undue distortion due to drop velocity variations particularly at lower drop rates.

However, should greater print quality and/or a higher drop rate be required, this result can be achieved with the same print head by an altered control method. One level of improvement can be achieved by selectively varying the amplitude of the drive signal. In this manner a closer match between the required drop volume and drop velocity can be achieved to improve print quality at higher drop rates. A still further improvement can be achieved by controlling not only the amplitude of the drive signals but also the pulse width of the drive signals.

Figure 3:
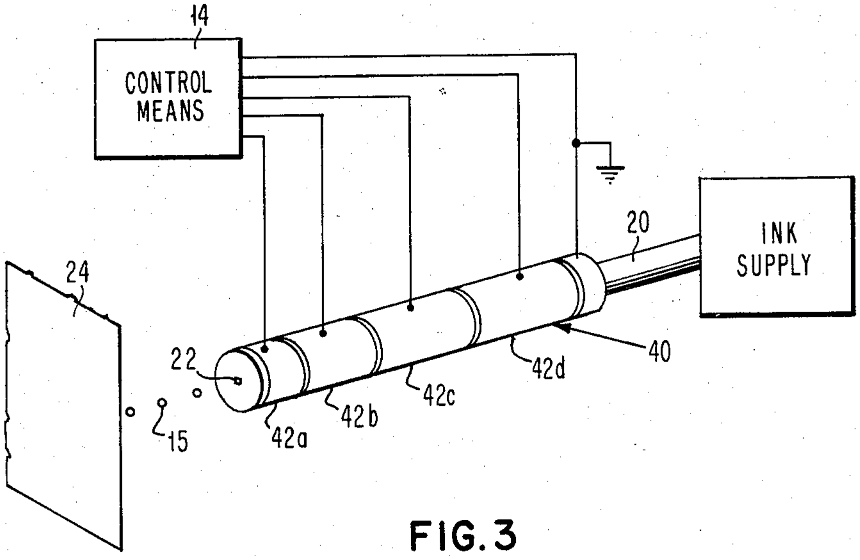
FIG. 3 is a perspective view of an alternate embodiment of the multi-section transducer of the system of FIG. 1.
Figure 4:
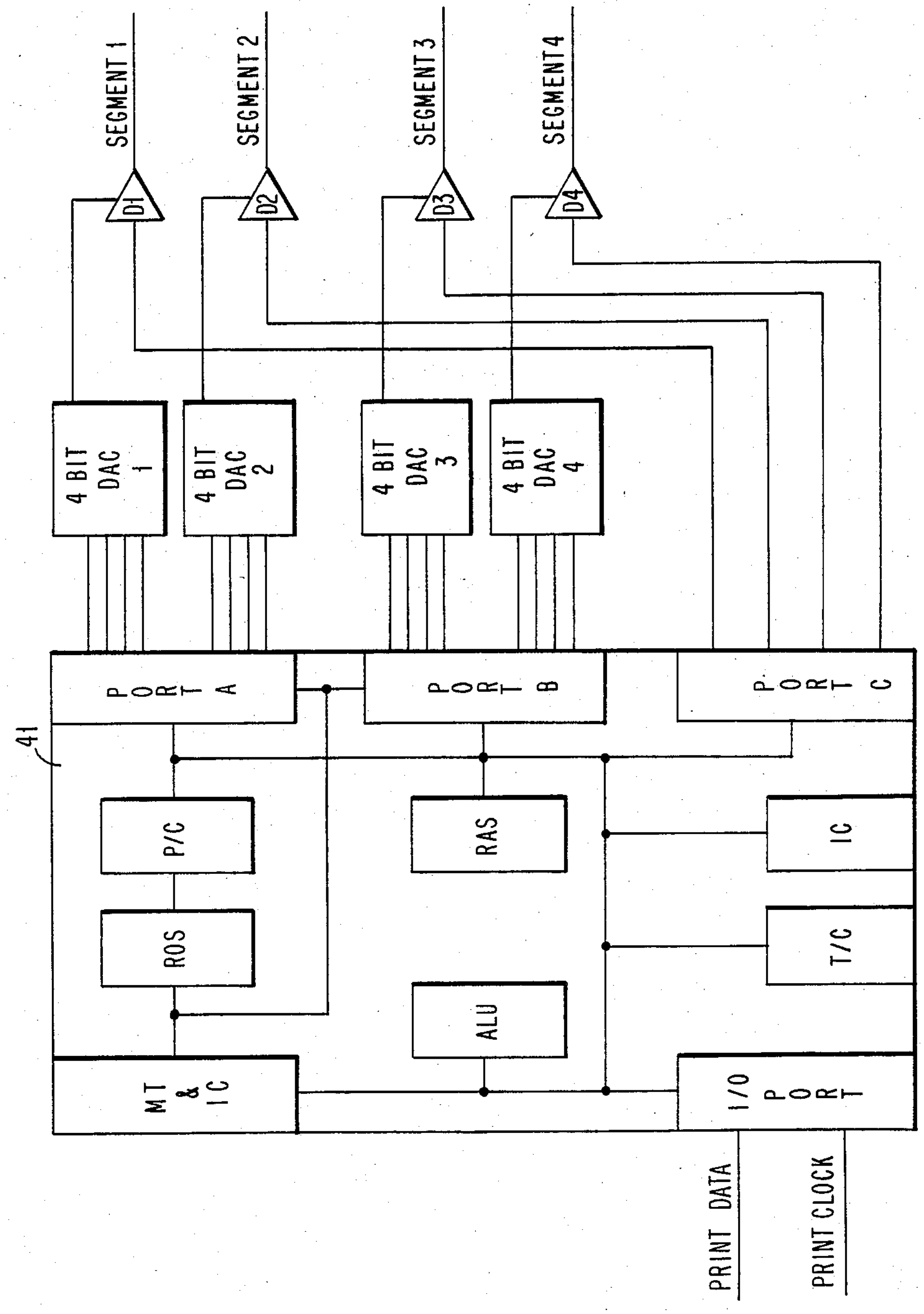
FIG. 4 is a schematic block diagram of the control means of the system of FIGS. 1 and 3.

In the embodiment shown in FIG. 3, the print head comprises a transducer means 40 including a plurality of individually actuable sections 42, 42*b*, 42*c*, 42*d*, each of a different length. In general, for n unequal length sections, n! drop volumes can be achieved by actuating different combinations of the individually actuable sections. Thus for the 4 sections shown in FIG. 3, it is possible to obtain 24 different drop volumes by driving the sections with a voltage pulse of a predetermined amplitude. Some variation in velocity would be present in the drops formed of the different volumes.

The drive to each of the individually actuable sections 42*a*-42*d* is substantially the same as that previously described for the print head shown in FIGS. 1 and 2. The various options and combinations described there are equally applicable to this embodiment to produce gray scale printing having the required print quality and printing rate.

Control means 14 produces the drive voltage signals for each of the separate sections 28 or 42 to produce ink drops 15 of the volume required to print a chosen pattern on record member 24. The chosen pattern is defined by PRINT DATA which is coupled to control means 14 in the form of a serial data stream. A PRINT CLOCK signal also is coupled into control means 14 to synchronize movement and position of the print head 10 with the formation of the ink drop 15 so that the desired pattern is produced on record member 24. In the embodiment shown, control means 14 includes a stand alone microcomputer 41 of which a number of suitable models are now available as standard off-the-shelf items such as Zilog model Z-8, Intel models 8041, 8048 or 8051 and Motorola models 6801 and 6805. As the description proceeds, it will be obvious to those skilled in the art that equivalent hard-wired control circuits could as well be used, if desired.

Microcomputer 41 includes an ALU 43, a Random Access Storage (RAS) 45 for storing data, a Program Center (P/C) 47 and a Read Only Store (ROS) 44 for storing the control program and control tables. An interval Timer/Counter (T/C) 46 is provided to produce a timed output in response to clock pulses. A series of output ports, PORT A, PORT B and PORT C provide latched output lines, and a serial PORT 48 receives the signals PRINT DATA and PRINT CLOCK which is used in conjunction with Interrupt Control (IC) 49. The Machine Timing & Instruction Control (MT&IC) 51 produces control signals for the processor and multiplexed Address/Data Bus 53 connects the components of the microcomputer 41 to provide a path for transfer of data, control signals and addresses between components of the microcomputer 41.

Figures 5, 6:
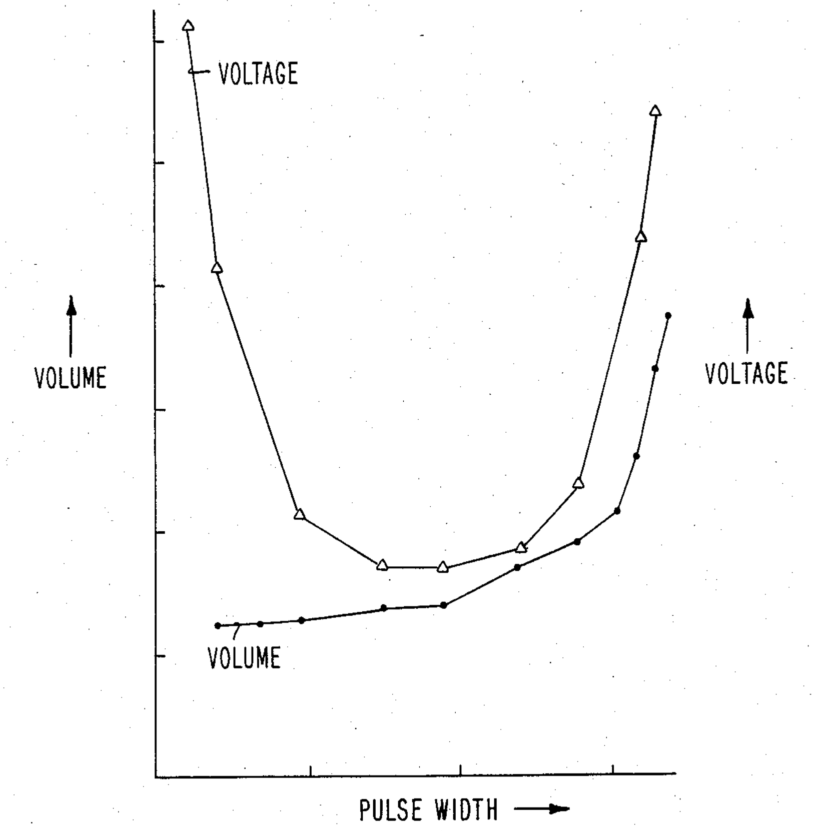
FIG. 5 is an example of a specific embodiment of a table containing data to control generation of ink drops with variation in drop size.
FIG. 6 is a graph showing the variation of ink drop volume with amplitude and pulse width at constant velocity for a specific embodiment of apparatus as shown in FIG. 1.

The microcode control program is stored in ROS 44 at addresses 000 to 3FF (hexadecimal) (1K bytes), and the Drop Size ROS Look-Up Table is stored in ROS 44 at addresses 400 to 7FF (hexadecimal) (1K bytes). The format of the Drop Size ROS Look-Up Table is shown in FIG. 5. The serial data stream PRINT DATA is coupled into the Serial Port 48 of microcomputer 40 and this data includes one byte (8 bits) of data referred to as the Drop Size Code to define each drop size. Note that this format provides the capacity to define 256 different drop sizes.

A graph showing the variation of drop volume with amplitude and pulse width at constant drop velocity for a specific design of print head is shown in FIG. 6. Should a sufficiently reliable model of the print head be available, the data for such a graph can be calculated. However, in some cases, the data must be generated empirically due to the large number of interrelated factor which affect the print head operation. Data similar to that shown in FIG. 6 is used to develop the data for the Drop Size ROS Look-Up Table.

Two of the 256 possible drop sizes are shown as an example in FIG. 5. In the first example, the Drop Size Code 34 (hexadecimal) (53rd of the 256 combinations) is used to generate the ROS address which is given by 4X (Drop Size Code) +400 in the specific example of four segments 28 or 42. The ROS address accesses the Data Segment Byte field, and this field has one byte of data for each section 28 or 42 of the transducer (four in the specific embodiment). The four bytes are stored in sequential locations. The low order four bit field of each byte contains the information defining the drive voltage amplitude, and the high order four bit field of each byte contains information defining the drive pulse width or duration. Note that each four bit field has the capacity to define 16 different levels of either amplitude or pulse width. Note that, in the table for Drop Size Code 34, both amplitude and pulse width for segment numbers 2 and 4 are zero. This means that segments 2 and 4 are not energized for that particular drop size. However, for Drop Size Code E9 (234th of the 256 combinations), a non-zero value is stored for each segment, so in this case each of the four segments is driven.

The Data Segment Byte for segment 1 is accessed from ROS 44 and the low order 4-bit field is latched into the microcomputer output PORT A, and the high order 4-bit field is used to set up pulse duration timer 46 for segment 1 for output to one line in PORT C. The second byte is accessed and the low order 4-bit field is latched into the remaining 4 lines of PORT A; and the high order 4-bit field is passed to the pulse duration timer setup routine to a second line in PORT C to control segment 2. A similar procedure is followed for the last two data bytes to control segments 3 and 4 by latching the amplitude data is the 8 lines of PORT B and the pulse duration data into two additional lines of PORT C.

The data latched into PORT A and PORT B is coupled in four bit fields to a Digital to Analog Converter (DAC) 50 where the data is converted to analog form. The output of the DAC 50 is coupled to Driver 52, one of which is provided for each of the segments 28 or 42. When the PRINT CLOCK signal is received by the microcomputer 41, all outputs of PORT C are turned ON to gate the appropriate Driver 52 to drive the corresponding segment 28 or 42 at the voltage amplitude of its respective DAC 50 according to the 4-bit codes in PORTS A & B. Each transducer driver 52 is turned OFF individually by pulling the output lines of PORT C to the down level according to the pulse duration field for each transducer segment, which was used to initialize the timer routine. The timer routine in a specific embodiment comprises a count down routine, but other routines may be used, if desired. When all lines of PORT C are low, the microcomputer is ready to process the next Drop Size Code.

The control mode permits the pulse drive amplitude and pulse width to be easily controlled for each of the separate transducer sections. To provide a constant drive amplitude, the entry in the table would have the same amplitude field entry for each transducer section to be energized, and a zero entry for those transducer sections not to be energized. The pulse width is controlled in the same manner. The drop size code for no drop to be produced is all zeros for both the amplitude and pulse width fields. The largest drop volume is produced in response to drop size code number 255.

While specific embodiments of the invention have been described, the specific examples are not meant to limit the invention. Various changes will occur to those skilled in the art. For example, a multinozzle printer can be made utilizing the principles described here for a single nozzle.

What is claimed is:

1. A drop-on-demand ink jet printing system for gray scale printing comprising a print head having an ink cavity filled with ink from an ink source which is not pressurized and means for selectively energizing a transducer to eject a single drop of ink from said ink cavity each time the transducer is energized, the improvement comprising:

means to eject a drop of ink having a selectively variable size, said means comprising a continuous electromechanical transducer having a plurality of separately actuable sections;

print data specifying the drop size of each of the ink drops required to produce the print image defined by said print data;

logic circuit control means operable in response to said print data to generate voltage control pulses for each ink drop required, means for coupling said voltage control pulses to drive a predetermined combination of sections of said transducer for actuation to produce an ink drop having the specified drop size and a predetermined drop velocity, said voltage control pulses for producing subsequent ones of said ink drops being operable to produce ink drops of the specified drop size and drop velocities equal to said predetermined drop velocity within predetermined limits.

2. The system according to claim 1 wherein each of said plurality of separately actuable sections is of equal length.

3. The system according to claim 2 wherein said logic circuit control means includes means for selectively varying the amplitude of said voltage control pulses to produce ink drops having the specified drop size and having drop velocities within the predetermined limits.

4. The system according to claim 3 wherein said logic circuit control means includes means for selectively varying the pulse width of the voltage control pulses to produce ink drops having the specified drop size and having drop velocities within the predetermined limits.

5. The system according to claim 1 wherein each of said plurality of separately actuable sections is of unequal length.

6. The system according to claim 5 wherein said logic circuit control means includes means for selectively varying the amplitude of said voltage control pulses to produce ink drops having the specified drop size and having drop velocities within the predetermined limits.

7. The system according to claim 6 wherein said logic circuit control means includes means for selectively varying the pulse width of said voltage control pulses to produce ink drops having the specified drop size and having drop velocities within the predetermined limits.

* * * * *